United States Patent
Gray, Jr.

(10) Patent No.: US 7,553,085 B2
(45) Date of Patent: Jun. 30, 2009

(54) FLUID BEARING AND METHOD OF OPERATION

(75) Inventor: Charles L. Gray, Jr., Pinckney, MI (US)

(73) Assignee: The United States of America as represented by the United States Environmental Protection Agency, Washington, DC (US)

( * ) Notice: Subject to any disclaimer, the term of this patent is extended or adjusted under 35 U.S.C. 154(b) by 448 days.

(21) Appl. No.: 11/413,796

(22) Filed: Apr. 28, 2006

(65) Prior Publication Data

US 2007/0253649 A1 Nov. 1, 2007

(51) Int. Cl.
F16C 32/06 (2006.01)

(52) U.S. Cl. .................... 384/100; 384/107
(58) Field of Classification Search .............. 384/100, 384/107–212
See application file for complete search history.

(56) References Cited

U.S. PATENT DOCUMENTS

| | | | | |
|---|---|---|---|---|
| 3,635,126 | A | 1/1972 | Engel et al. | 92/57 |
| 3,791,703 | A | 2/1974 | Ifield | 308/9 |
| 3,827,337 | A | 8/1974 | Pruvot | 91/489 |
| 3,960,417 | A | 6/1976 | Kraus | 308/170 |
| 3,998,501 | A * | 12/1976 | Cyphelly | 384/113 |
| 4,090,743 | A | 5/1978 | Suzuki et al. | 308/9 |
| 4,540,221 | A | 9/1985 | Frazer | 308/5 R |
| 4,788,902 | A | 12/1988 | Akasaka et al. | 91/486 |
| 4,836,693 | A | 6/1989 | Stroze | 384/121 |
| 4,915,510 | A | 4/1990 | Arvidsson | 384/99 |
| 5,094,144 | A | 3/1992 | Akasaka et al. | 91/486 |
| 5,182,978 | A | 2/1993 | Akasaka et al. | 91/499 |
| 5,219,447 | A | 6/1993 | Arvidsson | 384/99 |
| 5,231,912 | A | 8/1993 | Akasaka et al. | 91/499 |
| 5,447,375 | A | 9/1995 | Ochiai et al. | 384/100 |
| 5,449,235 | A | 9/1995 | Buckmann | 384/108 |
| 5,692,838 | A | 12/1997 | Yoshimoto et al. | 384/12 |
| 5,769,545 | A | 6/1998 | Bently et al. | 384/118 |
| 6,082,901 | A | 7/2000 | Arvidsson | 384/124 |
| 6,092,457 | A | 7/2000 | Inoue et al. | 92/129 |
| 6,142,672 | A | 11/2000 | Bently et al. | 384/118 |
| 6,354,186 | B1 | 3/2002 | Gibson et al. | 92/71 |

(Continued)

FOREIGN PATENT DOCUMENTS

JP 11-50952 2/1999

(Continued)

*Primary Examiner*—Thomas R Hannon
(74) *Attorney, Agent, or Firm*—Seed IP Intellectual Property Law Group PLLC (57) ABSTRACT

A fluid bearing includes hydrostatic pads formed in a surface and positioned to exert a separating force, and a land formed on the surface of the insert and configured to act as a bushing to allow rotation while the first and second pads are pressurized at less than a hydrostatic balance force. Pressurized fluid to the pads of the insert is controlled to prevent operation in full hydrostatic mode. More particularly, a separating force generated by surface force of the pads is controlled such that the separating force does not exceed a force exerted on the bearing. The fluid pressure is also controlled to keep the separating force within a selected margin of the force exerted on the bearing, to control wear of the bearing. Control of the separating force is achieved by selectively pressurizing individual hydrostatic pads, thereby effectively varying the active hydrostatic area of the bearing.

30 Claims, 7 Drawing Sheets

U.S. PATENT DOCUMENTS

| | | | |
|---|---|---|---|
| 6,360,982 B1 | 3/2002 | Pöppinghaus | 242/539 |
| 6,368,072 B1 | 4/2002 | Inoue et al. | 417/269 |
| 6,532,663 B2 * | 3/2003 | Brune et al. | 384/118 |
| 6,547,438 B2 * | 4/2003 | Shima | 384/100 |
| 6,874,994 B2 | 4/2005 | Folsom et al. | 417/209 |
| 7,014,429 B2 | 3/2006 | Gray, Jr. et al. | 417/269 |
| 2005/0147332 A1 | 7/2005 | Kobayashi et al. | 384/12 |
| 2005/0193888 A1 | 9/2005 | Gray, Jr. | 91/472 |

FOREIGN PATENT DOCUMENTS

| | | |
|---|---|---|
| JP | 11-117855 | 4/1999 |

* cited by examiner

FLUID BEARING AND METHOD OF OPERATION

BACKGROUND OF THE INVENTION

1. Field of the Invention

The present disclosure relates generally to thrust and journal bearings, and in particular, to hydrostatic bearings.

2. Description of the Related Art

Fluid bearings are bearings that operate with a layer of fluid, such as a gas or a liquid, between moving parts. In comparison to conventional bearings such as roller bearings or ball bearings, for example, fluid bearings provide significant reduction in friction and wear. One common type of fluid bearing is the hydrostatic bearing, in which a rotor element is supported by a fluid to rotate relative to a stator element. Typically, the bearing is provided with a fluid supply under pressure to one or more cavities, sometimes referred to as pads, which are commonly formed in a stator element, between the rotor and stator elements. When the total surface force in the cavities balances the downward force of the rotor element, the element lifts off the surface of the stator element, so that the rotor floats on the fluid. This eliminates mechanical contact between the rotor and stator, allowing the rotor to rotate virtually without friction. This condition is referred to herein as full hydrostatic operation.

The surface force is a function of the surface area of the pad and the pressure (psi) of the fluid in the pad. If the surface force drops below the balance force, the rotor will make contact with the stator, possibly resulting in damage to one or both surfaces. If fluid supply pressure is greater than a pressure necessary to establish the balance force, the rotor element is separated further and fluid escapes from the pads, while the surface force remains substantially constant, and equal to the balance force. It is common to maintain a slight overpressure of the fluid supply to ensure that there is no contact between the rotor and stator. However, any excess supply pressure results in loss of fluid. Because of the energy cost associated with pressurizing the fluid in the first place, this loss of fluid represents a loss of energy and a reduction in economy, so such losses are minimized wherever possible.

Several designs have been proposed for the deployment of hydrostatic bearings in hydraulic machines such as pump/motors. However, because of the limitations of hydrostatic bearings, there are problems associated with such use. In an application where the load on the bearing varies, such as in a variable-angle pump/motor, it is important that the fluid supply pressure be sufficiently high that at maximum load levels, the surface force is adequate to maintain the balance force, to avoid damage to the bearing. However, this means that when load levels drop, a significant overpressure will exist, resulting in loss of fluid. While many of the proposed designs attempt to address this problem, they are, for the most part, impractical or ineffective.

Figure 1A:
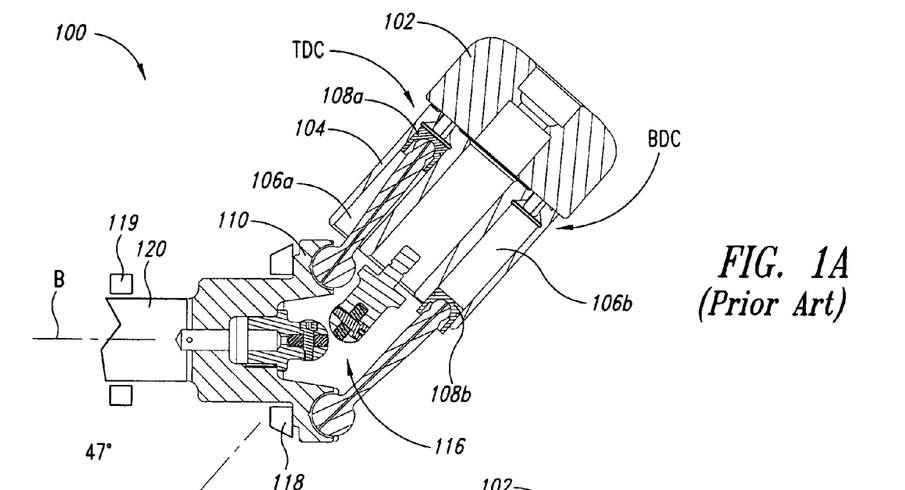
FIG. 1A is a cross-sectional elevational view of components of a hydraulic pump/motor according to known art, at a maximum stroke angle.
Figure 1B:
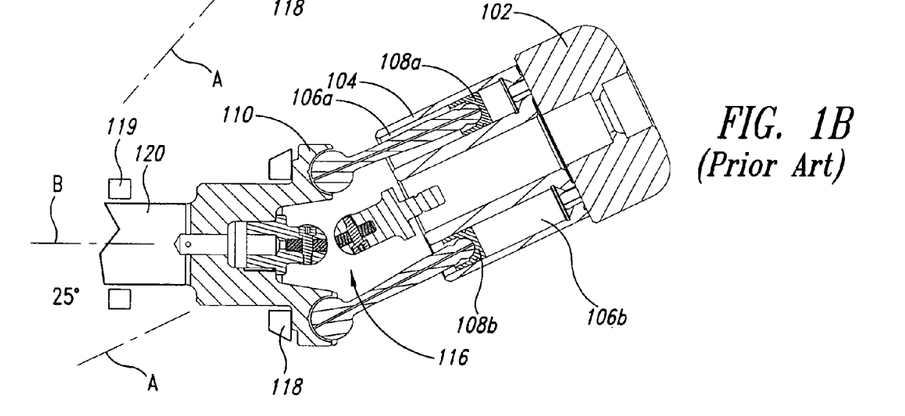
FIGS. 1B and 1C show sectional views of the pump/motor of FIG. 1A at moderate and zero stroke angles, respectively.
Figure 1C:
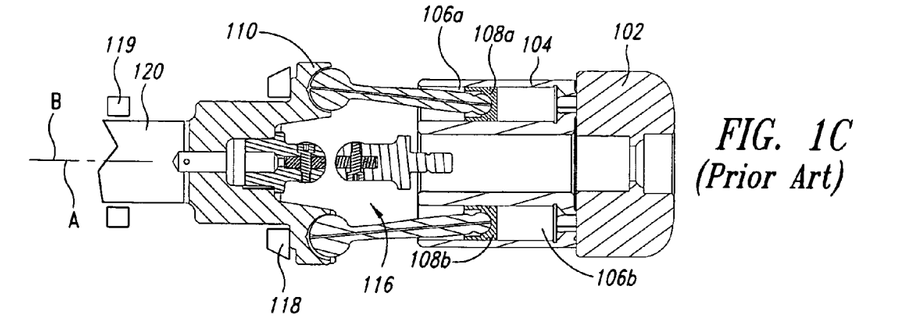

FIGS. 1A-1C show sectional views of a portion of a bent-axis pump/motor 100 according to known art. The motor 100 includes a valve plate 102 and a cylinder barrel 104, having a plurality of cylinders 106 within which pistons 108 travel reciprocally. Each of the pistons 108 engages a respective socket formed in a drive plate 110. The drive plate 110 is coupled to an output shaft 120 that is rotationally driven by the motor 100. The drive plate 110 bears against a thrust bearing 118 configured to permit free rotation of the drive plate 110 and shaft 120, while holding the drive plate in position against radial and axial forces acting thereon. A radial bearing 119 is positioned on the shaft 120 to stabilize the shaft while permitting free rotation. The bearing 118 is shown as a combination bearing, configured to bear radial and axial loads. Many motors employ separate axial and radial load bearings.

The cylinder barrel 104 is configured to rotate around a first axis A. The drive plate 110 rotates around an axis B, and is coupled to the rotating cylinder barrel 104 by a constant velocity joint 116 (only portions of which are shown in FIGS. 1A-1C). Accordingly, the cylinder barrel 104 and the drive plate 110 rotate at a common rate.

The valve plate 102, barrel 104, and pistons 108, which define axis A, are configured to rotate with respect to the drive plate 110, which defines axis B, for the purpose of varying the displacement volume of the pump/motor 100. The degree of rotation of axis A away from a coaxial relationship with axis B is typically referred to as the stroke-angle of the device.

When the motor 100 is operating in a motor mode, high-pressure fluid is valved into each cylinder 106 as it passes top-dead-center (TDC). The high-pressure fluid applies a driving force on the face of the piston 108, which acts axially on the piston 108 with respect to axis A. This force is transferred by the piston 108 to the drive plate 110. As each piston 108 passes bottom-dead-center (BDC), the fluid is vented from the piston 106, which allows the piston to be pushed back into the cylinder as the barrel rotates it back toward TDC.

Referring to FIG. 1A, it may be seen that the driving force on the pistons 108 is axial, relative to axis A, but includes both axial and radial force components, relative to axis B. The distribution of the driving force between the axial and radial components depends on the stroke angle of the motor 100. The axial component tends to drive the drive plate 110 away from the barrel 104 along axis B, which is prevented by the thrust bearing 118. The radial component of the driving force tends to drive the socket of the drive plate 110, into which the second end of the piston 108 is seated, to move downward, causing the drive plate 110 to rotate so that the socket moves further away from the barrel, with the barrel 104 rotating in unison with the drive plate 110.

It will be recognized that the lower the stroke angle, the more of the driving force will be distributed to the drive plate 110 as an axial force, until, at a zero stroke angle such as that shown in FIG. 1C, all of the drive force is distributed to the drive plate 110 as an axial force. On the other hand, when the motor 100 is at a high stroke angle such as that shown in FIG. 1A, more of the drive force will be distributed radially and will be experienced by the bearing 118 as a radial force. Moreover, because the drive force is in a downward direction, as viewed in the figures, all of that radial force will be experienced by the lower part of the bearing 118. At the same time, the drive plate 110 and shaft 120 act as a lever, against the bearing 118 as a fulcrum, such that an upward radial force is exerted on the axial bearing 119.

When the motor is at zero stroke angle, as shown in FIG. 1C, cylinders 106 on one side of the barrel 104, divided down the line defined by TDC and BDC, are at high-pressure, while those on the opposite side are at low pressure. Thus, the thrust bearing experiences a very high axial load on one side, and a much lower axial load on the other. These high and low sides are separated by 90° from the high and low sides with respect to radial distribution. Furthermore, if the pressure of the fluid circuit that drives the motor is reversed while the motor is rotating forward, the motor switches to pump mode, and the distribution of the axial load is reversed, so that the bearing 118 experiences the high axial load on the opposite side.

The motor 100 shown in FIGS. 1A-1C is depicted as having cylinders directly opposite one another such that when one cylinder 106 is at TDC, another will be at BDC. This arrangement is pictured to provide a view of cylinders 106 at both TDC and BDC in the same figure. However, in practice, most hydraulic motors employ an odd number of cylinders, typically seven or nine. As a result, in a nine-cylinder motor the number of cylinders that are pressurized at high-pressure will cycle back and forth between four and five cylinders, nine times for each revolution of the cylinder. This means that the axial and radial loads on the motor bearings will also drop by 20% each time there are four pressurized cylinders, then back up by the same amount when there are five pressurized cylinders.

In typical applications, pump/motors of the type described here experience frequent changes in direction and speed. While it has been thought desirable to employ fluid bearings with pump/motors of this kind in order to improve efficiency and reduce wear, it has been found problematic, due to the complex nature of the changes in force and vector at play in these systems.

It can be seen that the bearings of the motor 100 are subjected to widely ranging forces. Changes from high to low stroke angle, then back to high, can occur very fast and very frequently. Rotation speed and direction varies, and the motor may stop frequently. Finally, because of the odd-number arrangement of the cylinder barrel, there is a constant 20% fluctuation of force as the barrel rotates. Because of these extreme conditions, little success has been shown using fluid bearings.

A more detailed discussion regarding the operation and structure of hydraulic pump/motors may be found in U.S. Pat. No. 7,014,429, issued Mar. 21, 2006, entitled HIGH-EFFICIENCY, LARGE ANGLE, VARIABLE DISPLACEMENT HYDRAULIC PUMP/MOTOR; and U.S. Patent Publication No. 2005/0193888 A1, published Sep. 8, 2005, entitled EFFICIENT PUMP/MOTOR WITH REDUCED ENERGY LOSS, which patent and published patent application are incorporated herein by reference, in their entirety.

BRIEF SUMMARY OF THE INVENTION

According to an embodiment of the invention, a fluid bearing is provided, comprising an insert configured to be received between first and second elements of a machine in which the second element is adapted to rotate with respect to the first element, hydrostatic pads formed in a surface of the insert and positioned to exert a separating force between the first and second elements, and a bushing between the first and second elements to allow rotation of the second element with respect to the first element while the first and second pads are pressurized at a pressure less than that required to establish a hydrostatic balance force.

The surface of the insert may have a cylindrical shape configured to receive a cylindrical second element, or it may be substantially planar to receive an element that is configured to rotate around an axis lying at right angles to the surface of the insert. In the case of the cylindrical insert, the insert may be shaped to encompass less than 360 degrees of the cylindrical shape.

Flow of pressurized fluid to the pads of the insert is controlled such that the bearing does not operate in full hydrostatic mode. Instead, a separating force generated by surface force of the fluid is controlled such that the force exerted on the bearing exceeds the separating force, although the fluid pressure is also controlled to selected pads to keep the separating force within a selected margin of the force exerted on the bearing, to control friction and wear of the bearing.

According to an embodiment, control of the separating force is achieved by selectively pressurizing individual hydrostatic pads, thereby effectively varying the active hydrostatic area of the bearing.

DETAILED DESCRIPTION OF THE INVENTION

Various embodiments of the invention will now be described with reference to FIGS. 2-6. For the purpose of the disclosure and claims, the term fluid pressure will be used to refer to pressure of a fluid relative to area, such as, for example, psi. The term surface force will be used to refer to hydrostatic force exerted on an opposing surface, which is a function of the fluid pressure multiplied by the total surface area of pressurized fluid in contact with the opposing surface. Separating force refers to the force exerted by the surface force to separate elements. The term balance force will be used to refer to a hydrostatic force at which the surface force exerts a force equal to an opposing force exerted by an opposing surface. Either of the terms "motor" and "pump/motor" may be considered to read on a hydraulic motor, pump, or pump/motor.

The term axial force is used herein to refer to force vectors that lie substantially parallel to an axis of rotation of a motor's drive plate, while radial force is used to refer to force vectors that lie in a plane that is substantially perpendicular to the axis of rotation. Neither term is limited to vectors that intersect the axis. In particular, the radial forces referred to herein may lie in vectors some distance from the defined axis such that a device that is configured to rotate about the axis, and upon which the radial forces act, will tend to rotate in reaction to the forces.

The term bushing material is used to refer to a material configured to receive a moving surface against its nonmoving surface without suffering damage due to galling, scoring, etc. Bushings made from such material are well known with reference, for example, to cylindrical bushings, such as bronze sleeves that act as journal bearings. Such sleeves are positioned within an aperture or fitting in a machine, and a shaft is positioned within the bushing, where it is supported for rotation. Frequently a thin oil film is provided to further reduce friction. In the present specification and claims, bushing is used more broadly to refer to materials and structures that serve a similar function, whether in a cylindrical shape or some other shape, such as, for example, a component having a planar surface. The term bushing is also used to refer to conventional mechanical bearings such as, for example, roller bearings and ball bearings. In the specification, solid bushing may be used to distinguish an element made from bushing material from an element configured to operate as a conventional mechanical bearing, with rollers, balls, etc. Nevertheless, when used in the claims, bushing is to be construed broadly to include either general type of structure unless otherwise specified.

Figure 2:
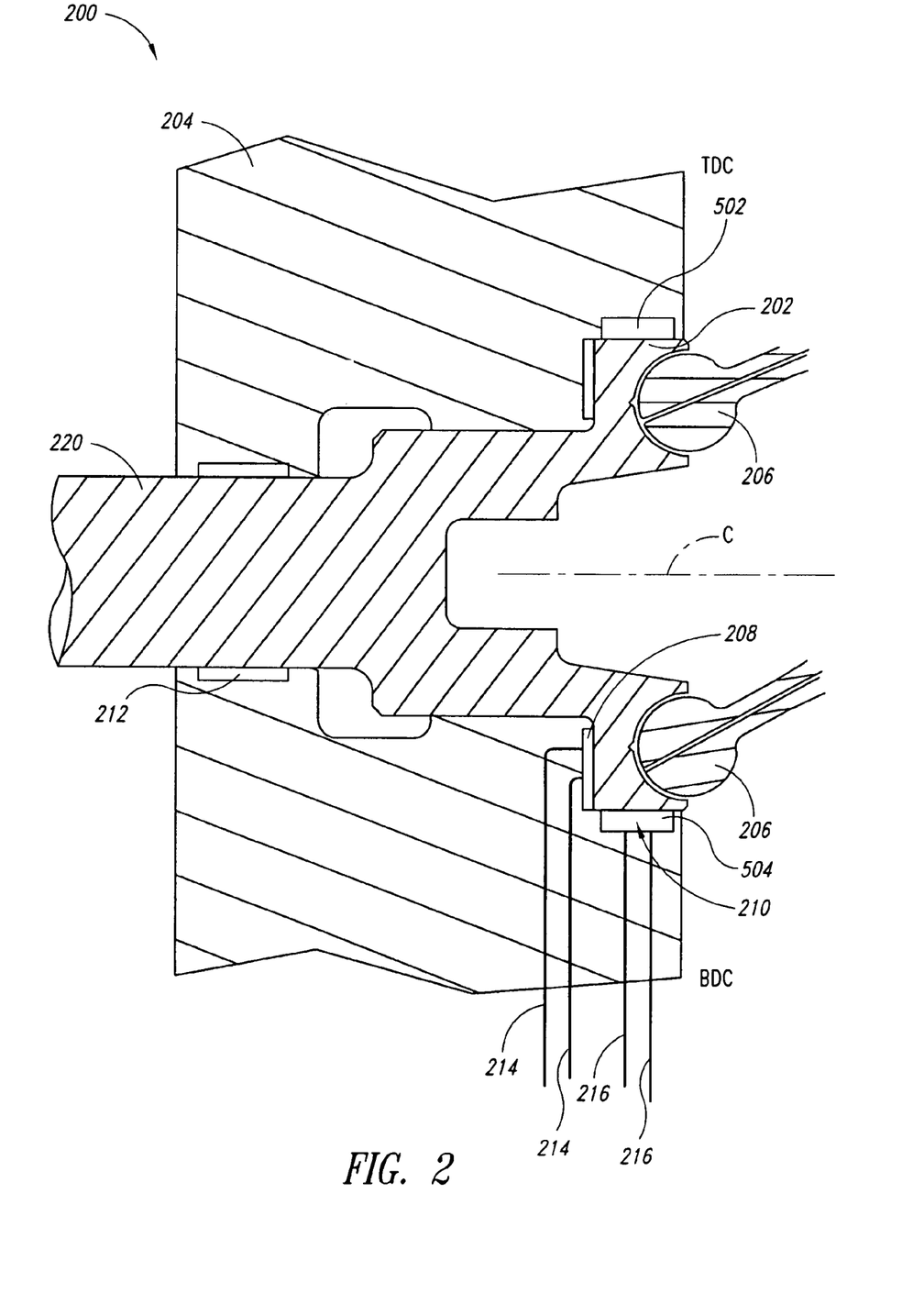
FIG. 2 shows a simplified sectional view of a hydraulic pump/motor according to an embodiment of the invention.

Referring to FIG. 2, a simplified sectional view of a portion of a hydraulic pump/motor 200 is illustrated. The motor 200 operates according to the principles outlined with respect to FIGS. 1A-1C, and includes a drive plate 202 carried in a casing 204 and driven by pistons 206. The pistons 206 are driven by pressurized fluid in cylinders of a cylinder barrel that is not shown in FIG. 2, since the basic operation of a typical bent-axis hydraulic motor is previously described and is well known in the art. Fluid bearings are provided for operation of the motor 200. More particularly, an axial, or thrust bearing 208 is positioned and configured to receive axial loads from the drive plate 202, while radial bearing 210, is configured to receive radial loads exerted thereon by the drive plate 202. Radial bearing 212 may be a fluid type bearing or a conventional bearing, and is configured to support the output shaft 220.

Fluid supply lines indicated generally and diagrammatically at 214 provide pressurized fluid to the thrust bearing 208, while fluid supply lines 216 provide pressurized fluid to the radial bearing 210. The fluid supply lines 214 and 216 illustrated in FIG. 2 are not intended to represent the actual number or arrangement of supply lines necessary for any particular embodiment, inasmuch as such details will depend on various design factors that will become obvious to one of ordinary skill upon review of the present description.

Some bent-axis pump/motors are referred to as over-center machines because they are capable of varying the stroke angle in the negative direction, i.e., downward, as viewed in FIG. 1. This allows the machine to reverse rotation by moving to a negative angle rather than by reversing polarity of the fluid pressure driving the motor. The motor 200 of FIG. 2 is not described below as an over-center machine, but as the more common type, in which the piston angle is always 0° or above. Nevertheless, the principles described herein may be applied to the operation of an over-center machine, as well.

In the description that follows, the structure and operation of various embodiments will be described with reference to a nine-cylinder motor. One of ordinary skill will recognize that the principles described may be easily adapted for use with motors having other configurations, including motors having an even-number of cylinders.

The force from the pistons 206 is distributed as axial force, which is parallel to the axis C, and radial force, which is perpendicular to the axis C. As the angle of the pistons is varied, the distribution of force varies, between axial and radial, that is applied to the drive plate 202. If the angle is 0°, in which the pistons are parallel to the axis C, the distribution will be 100% axial and 0% radial. As the stroke angle increases, the axial force decreases as a function of the cosine of the stroke angle, while the radial force increases as a function of the sine of the stroke angle. Depending on the design of the motor 200, it may be capable of a maximum angle of 45° or greater. At 45° the radial and axial forces will each be about 70% of the maximum axial force.

Figure 3:
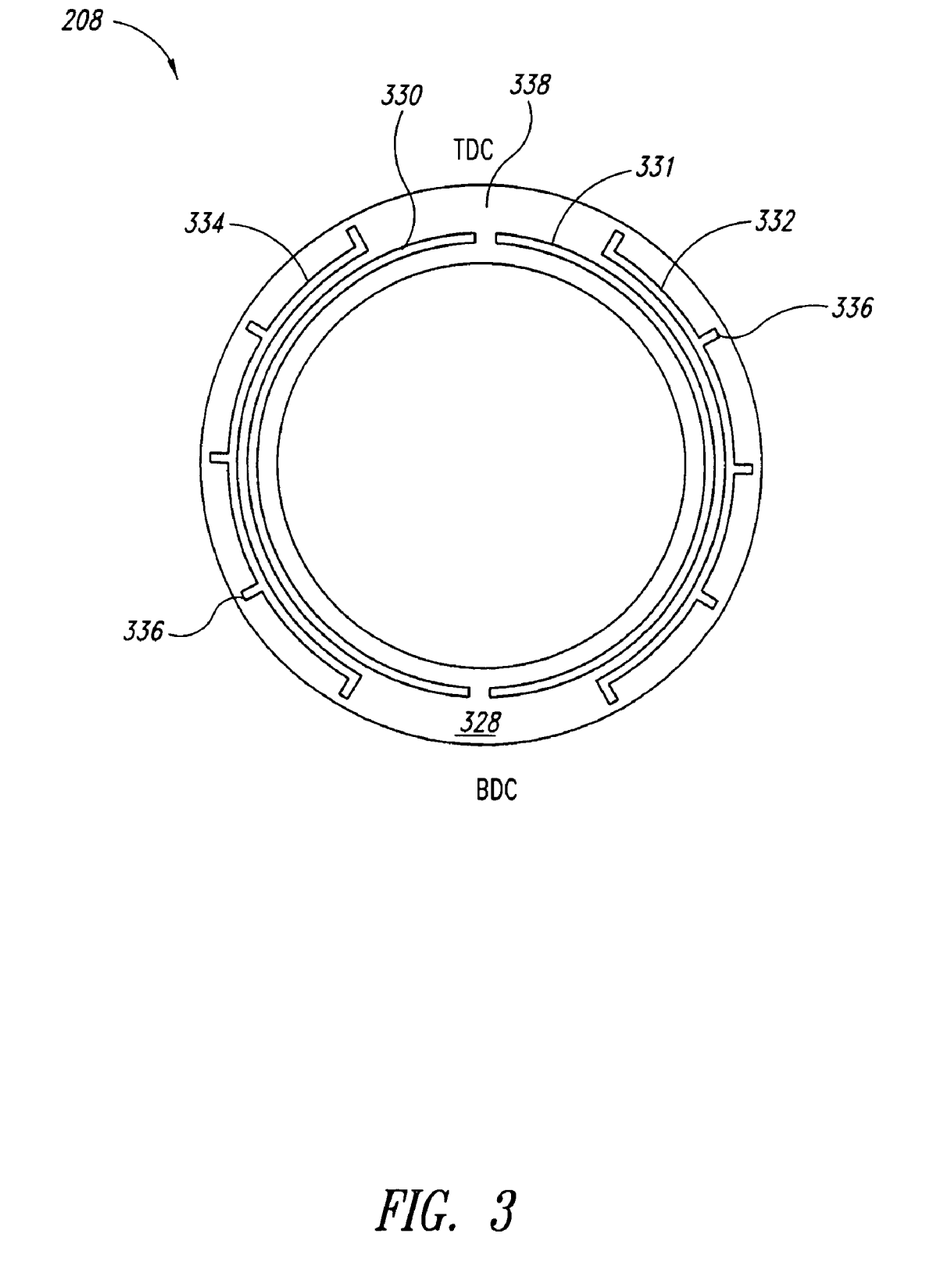
FIG. 3 shows a plan view of an insert of a fluid bearing according to an embodiment of the invention.

Referring now to FIG. 3, the thrust bearing 208 is shown in plan view, showing the surface that contacts the drive plate 202. The upper surface of the bearing 208 includes a land area 328, first and second arcuate hydrostatic pads 330, 331, and third and fourth arcuate hydrostatic pads 332, 334, which may include a plurality of radial wetting grooves 336. According to one embodiment, the pads 330, 331, 332, and 334 are formed in an insert 338 that fits within a recess provided in the casing 204. A pressurized fluid supply is provided to the grooves 330, 331, 332, and 334 via supply lines 214.

The bearing insert 338, or at least the upper surface comprising the land 328, is formed of a bushing material that is configured to tolerate contact with the drive plate 202 within selected limits. Such material is known in the art. For example, various types of polymerized metals have been developed that are effective in controlling friction. In other cases, a lubricant-impregnated metal may be employed to facilitate a low friction contact.

According to an embodiment, the surface area of the land and formulation of the bearing insert 338 are selected such that the bearing 208 can tolerate a direct load during operation of the motor 200 of up to around 35% of the maximum axial load of the motor 200. Because the land 328 of the bearing 208 is configured to operate as a solid bushing in contact with the drive plate 202, it is beneficial to maintain a thin film of lubricating fluid between the bearing 208 and drive plate 202. Accordingly, in the embodiment illustrated, radial wetting grooves 336 are provided to place hydraulic fluid in contact with a large portion of the surface area in contact between the drive plate 202 and bearing 208 as the drive plate 202 rotates, in order to distribute the fluid as a lubricant. Alternative embodiments may omit such grooves, or provide other means for wetting the contact surfaces of the bearing and drive plate.

In operation, before the stroke angle of the motor 200 is rotated from 0° to begin rotation from a stopped condition, either the pads 330 and 334 or 331 and 332 are provided with hydraulic fluid at a fluid pressure sufficient to offset at least 65% of the maximum axial load so that the remaining axial load falls within the 35% that the bearing 208 can tolerate. The determination of which grooves are pressurized is determined by the polarity of the motor 200: if the cylinders on the left, as viewed from the orientation of the bearing 208 pictured in FIG. 3, are pressurized at high-pressure, grooves 330 and 334 will be pressurized to offset the force exerted by the pistons of those cylinders. Conversely, if the polarity of the motor is reversed so that the high-pressure force is exerted on the right, pads 331 and 332 will be pressurized. This may be accomplished by the same valves that control polarity of the motor, or separate fluid valves may be employed for this purpose. For the purpose of this description, it will be assumed that the polarity of the motor is such that the high-pressure force is exerted on the left, over pads 330 and 334. It will be understood that operation of the motor in the opposite polarity is substantially identical, except that pads 331, 332 will support the high-pressure force.

Figure 4:
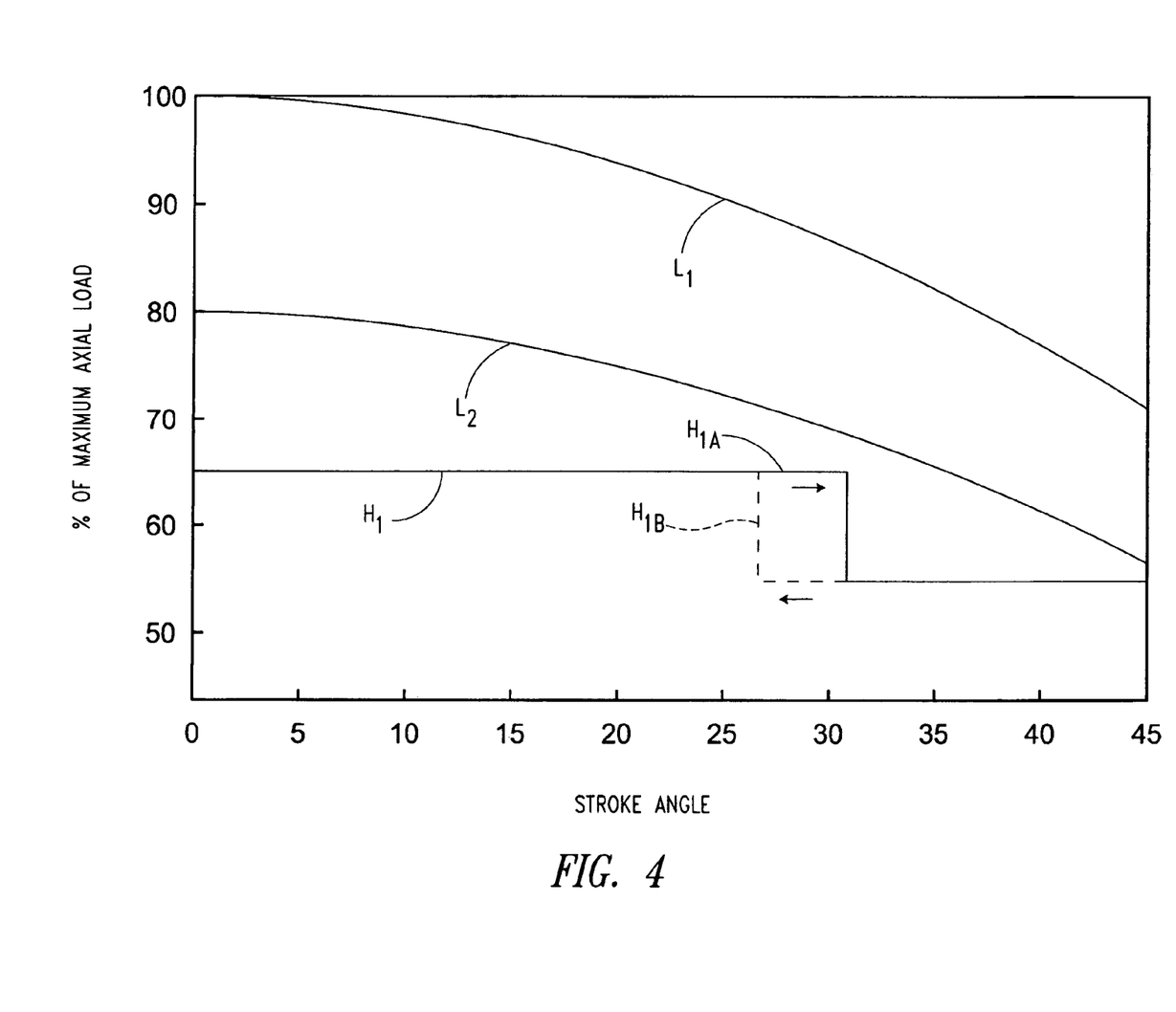
FIG. 4 is a graph showing the relationship between the stroke angle of the motor of FIG. 2 and the axial load on the bearing shown in FIG. 3, as a percentage of the maximum axial force of the motor.

As the stroke angle increases from 0° and the drive plate 202 begins to rotate with respect to the casing 204 and the bearing 208, the axial load on the bearing 208 will begin to drop. FIG. 4 is a graph showing the relationship between the stroke angle of a motor having nine cylinders and the axial load on a thrust bearing such as bearing 208 of FIG. 3, as a percentage of the maximum axial force of the motor. Line $L_1$ traces the axial load exerted while five of the nine cylinders are pressurized, and line $L_2$ traces the axial load exerted while four of the nine cylinders are pressurized. As the cylinder barrel of the motor rotates, the axial load will constantly fluctuate between $L_1$ and $L_2$ along a vertical line corresponding to the particular stroke angle of the motor. Line $H_1$ traces the offsetting surface force applied by the pressurized fluid in the pads 330 and 334, and the area between the line $H_1$ and the lines $L_1$ and $L_2$ shows the residual force exerted by the drive plate 202 on the land 328 of the bearing 208 under the pressure of the five and four pistons, respectively at any given stroke angle. This force may be referred to as a clamping force, holding the drive plate 202 against the bearing 208 and preventing fluid loss from the bearing 208.

As long as the offsetting surface force of the pads 330, 334 remains below the balance force necessary to operate in full hydrostatic operation, the bearing remains clamped and there is no appreciable leakage of fluid from the pads 330, 334. The bearing 208 of the present embodiment is configured to operate in this manner to minimize fluid loss, and thereby improve operational economy. It may be seen that as the axial load decreases in response to the increase of the stroke angle, the line $H_1$ converges with $L_1$, and $L_2$. If at any point during the operation of the motor the forces represented on the graph by the lines $H_1$ and $L_2$ intersect, the surface force will exceed the balance force, and at that stroke angle the bearing will begin to operate in full hydrostatic mode and fluid will be forced from the pads 330, 334 each time the axial force drops from $L_1$, to $L_2$. As indicated above, this condition results in a loss of pressurized fluid, and is to be avoided. Accordingly, when the stroke angle of the motor increases above around 31°, according to the embodiment described herein, fluid pressure to pad 330 is removed, i.e., shut off by a valve in the appropriate supply line 214. This reduces the total effective area of the hydrostatic pads of the bearing 208, and thus reduces the surface force, as shown in FIG. 4, thereby maintaining clamping force on the bearing 208. This ability to adjust the effective area of the hydrostatic pads enables the bearing to withstand the varying forces without resulting in significant overpressure or leakage as would otherwise occur.

For the purpose of this description, the range in which both pads 330, 334 are pressurized will be referred to as the first zone of operation, and the range in which only pad 334 is pressurized will be referred to as the second zone of operation. The respective areas of pads 330 and 334 are selected such that throughout the second zone of operation, the clamping force is still within the 35% limit of the bearing land 328, yet will not intersect $L_2$ at the maximum stroke angle of 45°. To avoid chatter when the motor is operating at a stroke angle very near the transition point between the first and second zones, a hysteresis path may be provided such that the system transitions from the first zone to the second zone at a higher angle, shown as path $H_{1A}$ in FIG. 4, than the return transition from the second zone to the first, shown as path $H_{1B}$.

Additional zones of operation may be provided for by incorporating additional fluid pads on the face of the bearing. This will permit the formulation of bearings that are not required to withstand such a high load, but would also require more frequent switching as the stroke angle changes and requires changes to the additional zones of operation. In some alternative embodiments, a single fluid pad is provided, thereby reducing the complexity of the bearing, as compared to a bearing having two or more pads. In such embodiments, the single fluid pad may be configured to provide a constant separating force at about the level shown in the second zone of FIG. 4, for example, or the fluid pressure may be reduced or switched off at a selected stroke angle. It will be recognized that in some of these embodiments, it will be necessary for the bushing to be configured to tolerate a higher load than that of the embodiments pictured.

Particular features of the bearing, such as, for example, the number of pads, the area of each of the pads and lands of the bearing, the fluid switching scheme, and the arrangement of wetting grooves, are all matters of design that will be influenced by factors such as the maximum axial load, duty cycle, machine size, number of cylinders, etc., and are within the abilities of one of ordinary skill in the art.

According to an embodiment, the areas of the pads are selected such that the system operates as described above when the fluid supply pressure used to pressurize the pads is equal to the high-pressure fluid used to drive the motor. This reduces the complexity and increases reliability of the system as compared to systems that require regulated pressure for hydrostatic operation. Alternatively, fluid pressure to the hydrostatic pads may be regulated to a pressure that is different from the fluid pressure employed to provide power to the motor.

An issue that arises in many hydraulic motors of the type described here is the problem of stiction. When the motor is at a zero stroke angle and there is no rotation, the maximum axial force is applied to the bearing, but there is no opportunity to maintain fluid lubrication such as occurs when the motor is rotating and the wetting grooves 336 continually wipe the surface of the drive plate 202. As a result, the thin film of lubricating fluid may be squeezed out from between the drive plate 202 and the bearing 208. This creates a sticking effect between the land 328 and the drive plate, which resists initial rotation of the motor. To prevent stiction, one or both of the opposite pads 331, 332 may be pulsed with fluid pressure when the motor is first rotated from a zero stroke angle. The clamping force can easily be overcome by such a fluid pulse, which will momentarily lift drive plate 202 and force fluid between the land 328 and the drive plate 202.

Figure 5:
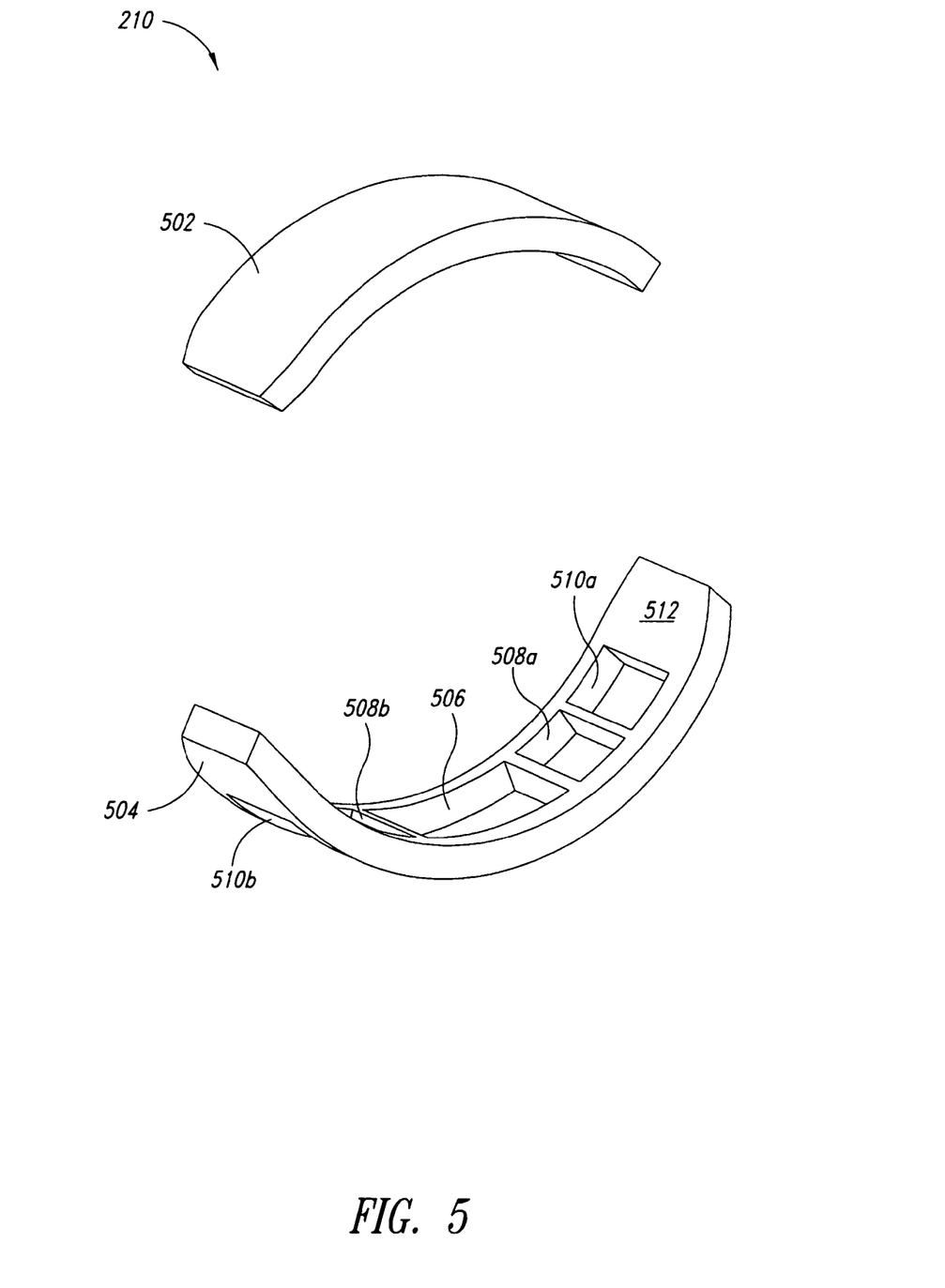
FIG. 5 shows upper and lower races of a radial bearing of the motor of FIG. 2.

Referring now to FIG. 5, the radial bearing 210 is illustrated according to an embodiment of the invention. Bearing 210 comprises upper and lower bearing races 502, 504 configured to be received in recesses in the casing 204 of the motor 202, as shown in FIG. 2. Lower race 504 includes first, second, and third hydrostatic pads 506, 508, and 510 surrounded by a land 512. The first pad 506 is centered in the lower race 504, while the second pad 508 comprises sections 508a and 508b that are spaced outward from the first pad 506, on either side, and the third pad 510 comprises sections 510a and 510b that are spaced outward from pads 506 and 508. Sections 508a and 508b are in fluid communication with each other via fluid lines not shown in detail, and sections 510a and 510b are likewise in fluid communication with each other. The bearing 210 is formed of a suitable bushing material and is configured to support direct contact of the drive plate up to about 25% of the maximum axial load, or about 35% of the maximum radial load. Fluid supply lines 216 provide an individually switchable pressurized fluid supply to each of pads 506, 508, and 510. The upper and lower races 502, 504 are centered over TDC and BDC, respectively, as shown in FIG. 2. Because any radial load in this machine is always directed downward (as oriented in FIG. 2), the upper race 502 will receive only nominal loads, and so the upper race is not provided with fluid pads.

Figure 6:
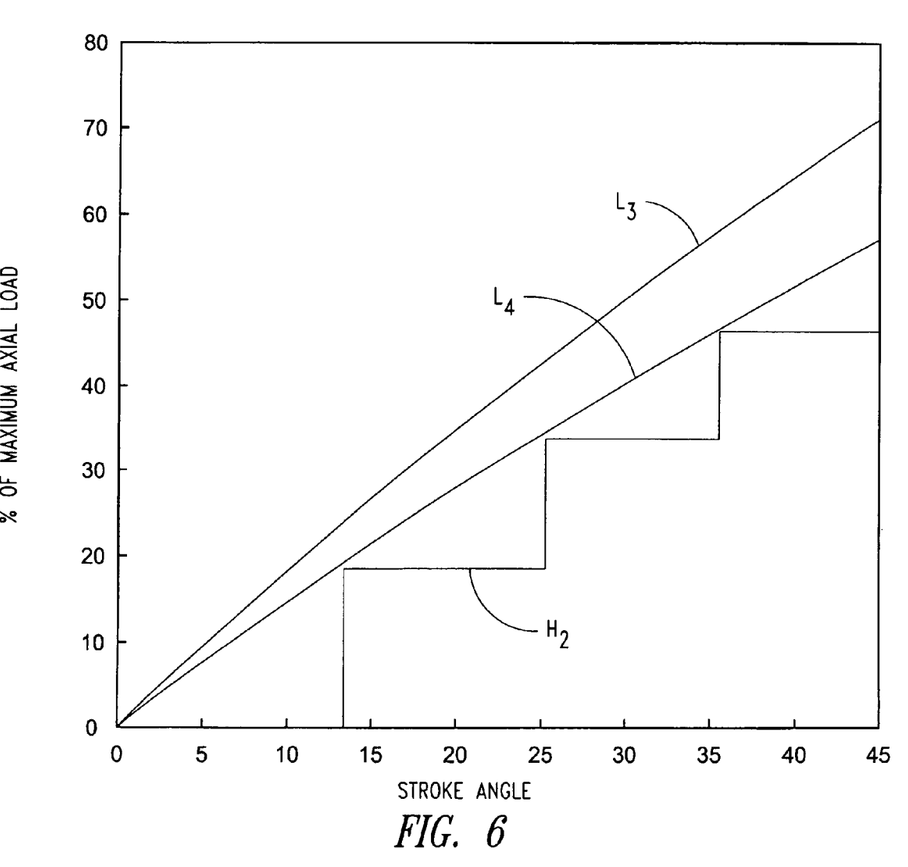
FIG. 6 is a graph showing the relationship between the stroke angle of the motor of FIG. 2 and the radial load on the bearing shown in FIG. 5, as a percentage of the maximum axial force of the motor.

FIG. 6 is a graph showing the relationship between the stroke angle of the motor 200 and the radial load on the bearing 210, as a percentage of the maximum axial force of the motor 200. Line $L_3$ traces the radial load exerted while five of the nine cylinders are pressurized, and line $L_4$ traces the radial load exerted while four of the nine cylinders are pressurized. Line $H_2$ traces the offsetting surface force applied by pressurized fluid in pads 506, 508, and 510. The clamping force is represented by the vertical distance between the line $H_2$ and the lines $L_3$ and $L_4$.

In contrast to the axial load described with reference to FIG. 3, the radial load on the bearing 210 is substantially zero while the motor is at a zero stroke angle, and rises as the stroke angle increases, as a function of the sine of the stroke angle. Accordingly, only sufficient fluid pressure to wet the land 512 of the bearing 210 is provided until the stroke angle reaches about 18°, at which point high-pressure fluid is supplied to the first pad 506. In like manner, as the stroke angle reaches about 25°, the second pad 508 is also pressurized, and as the stroke angle reaches about 36°, the third pad is also pressurized. Because the second and third pads 508, 510 are each separated into two sections, the offsetting force provided is balanced with respect to the drive plate 202. Though not shown in FIG. 6, switching of the fluid pressure in the respective pads 506, 508, and 510 may be provided hysteretically to avoid chatter, as described in more detail with reference to FIG. 4.

In a like manner as was described with reference to the axial bearing 208 to avoid stiction, any or all of pads 506, 508 or 510 may be pulsed with fluid pressure at a lower stroke angle to momentarily overcome the radial clamping force and allow the motor to begin rotation. Additionally, in cases where the motor is configured to operate under conditions requiring extremely high torque such that a maximum stroke angle is required to initiate rotation, an additional fluid pad, or provision for a momentarily boosted fluid supply pressure, may be provided to create a sufficient separating force to overcome stiction.

Because the radial forces on the drive plate are substantially unidirectional, the bearing 210 receives those forces only in the region supported by the hydrostatic pads 506, 508, and 510. The drive plate 202 does not undergo significant lateral radial loads, and so there is no requirement for increased bearing surfaces on the sides of the plate 202. Accordingly, the bearing 210 can comprise the upper and lower races 502, 504, with substantial area between that is not supported by the bearing. This is particularly advantageous in a bent-axis pump/motor of the type described herein. Though not shown, such motors typically include a yoke that supports the valve plate and cylinder barrel, and which rotates on pins or trunnions that are positioned on either side of the drive plate to control the stroke angle rotation. In motors employing conventional bearings, such as the motor illustrated in FIGS. 1A-1C, the radial bearings must be positioned below the drive plate, as shown at 118, to avoid interfering with the trunnions. However, this gives rise to the lever/fulcrum action described with reference to FIGS. 1A-1C, which transmits radial loads down the length of the output shaft, necessitating additional substantial radial load bearings. In contrast, radial bearings according to embodiments of the invention can be positioned higher on the drive plate so that they are more nearly directly opposite the radial force vectors, thereby substantially eliminating the lever/fulcrum action. Accordingly, bearings that support the output shaft (such as the second radial bearing 212 of FIG. 2) need not be configured to tolerate large radial loads.

According to an embodiment of the invention, the upper race 502 of the radial bearing 210 is provided with hydrostatic pads similar to those described with reference to the lower race 504, for operation with an over-center motor, such that when the motor is stroked to a negative angle, the pads of the upper race are pressurized as described above with reference to the lower race 504.

Control of hydrostatic fluid pressure in the fluid bearings, according to the various embodiments of the invention, may be provided by valving that is integral with the device associated with the bearing. For example, in the case of a bent-axis pump/motor of the kind described with reference to FIG. 2, the same valves that are configured to provide the high- and low-pressure fluid supply to the motor 200 may also be adapted to provide pressurized fluid to the bearings. The valve may also incorporate pressure regulators or the like. Alternatively, separate control valves may be employed for these purposes. Furthermore, control devices such as mechanical linkages, electronic devices and circuits, and computer modules may be employed to regulate fluid switching and pressure. All of these control systems are within the abilities of one of ordinary skill in the art.

Embodiments of the invention have been described with respect to an insert received in a recess of a component, usually the stationary component, such as the casing of the motor of FIG. 2. According to another embodiment of the invention, the hydrostatic pads are formed directly in a surface of one of the components. Furthermore, according to an embodiment, the pads may be formed in the rotating component. In such a case, fluid pressure may be provided via supply lines in the stationary component and opening onto a face of the stationary component such that as the pads rotate over the end of the supply lines, fluid is provided to the pads.

Figure 7:
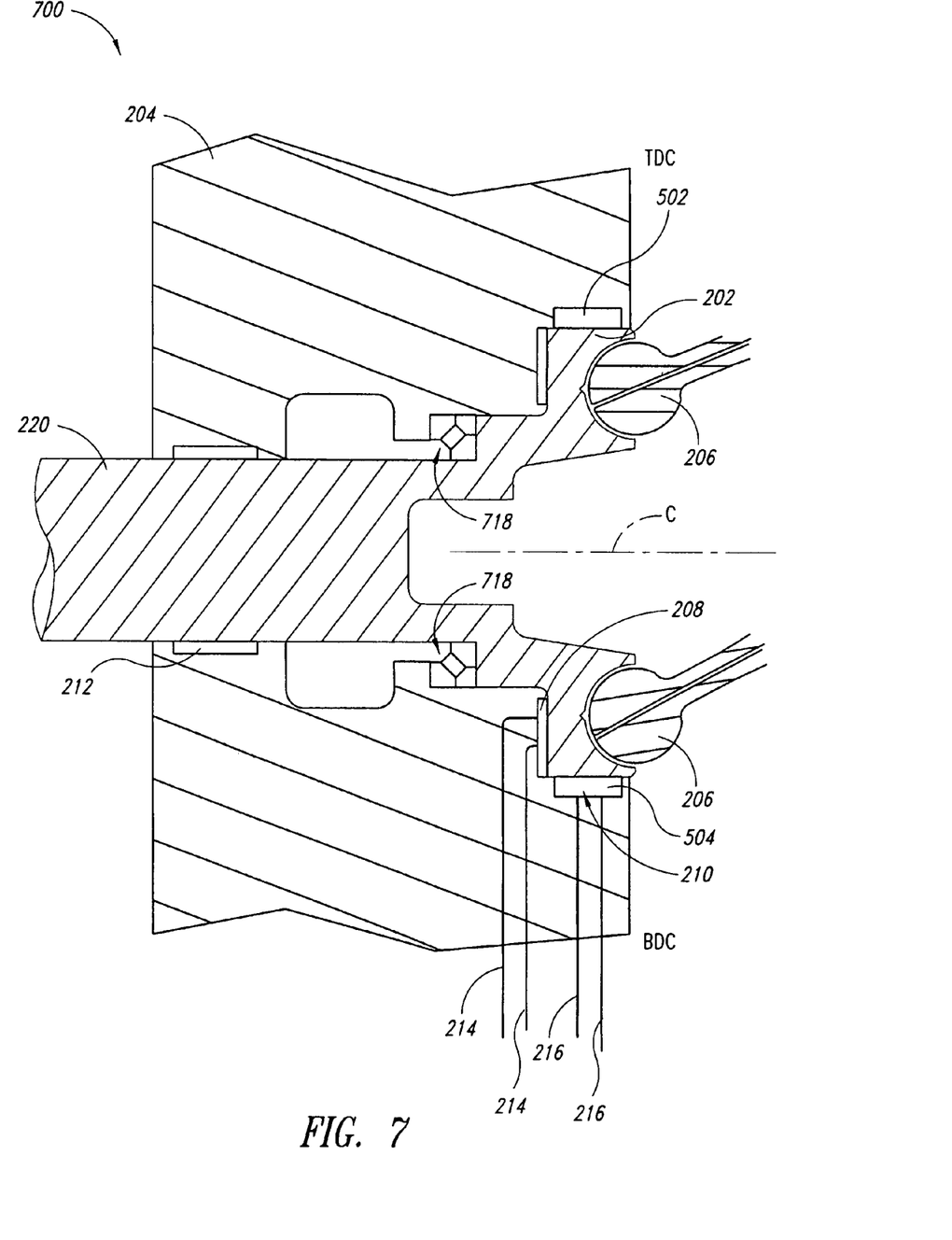
FIG. 7 shows a simplified sectional view of a hydraulic pump/motor according to an alternate embodiment of the invention.

Embodiments of the invention have been described in which solid bushings are employed as lands to withstand the entire clamping force on the bearing. It will be recognized that, especially in motors having an odd number of bearings, the clamping force may at some stroke angles be significant, necessitating a land having a substantial surface area. According to alternate embodiments, some or all of the clamping force may be received by bushings configured as conventional mechanical bearings. For example, FIG. 7 shows a motor 700 that is substantially identical to the motor 200 illustrated in FIG. 2 except that the motor 700 includes a small tapered roller bearing 718. Bearing 718 is configured to act as a supplemental bushing, receiving a portion of the clamping force that would otherwise be applied to the lands of bearings 208 and 210. This permits the surface area of the respective lands to be significantly reduced, thereby reducing the overall dimensions of the motor 700 as compared to those of the motor 200 of FIG. 2. Nevertheless, because most of the load exerted by the drive plate 202 is supported by the fluid pads of the bearings 208 and 210, the collective size of the bearings 208, 210, and 718 is at least substantially comparable to the size of the bearing or bearings of an otherwise equivalent conventional motor, while the comparable efficiency is significantly superior.

According to embodiments of the invention, conventional bearings may be employed to supplement or replace solid bushings in both radial and axial load bearings, or in only one or the other. Furthermore, fluid bearings may be used in combination with non-fluid bearings. For example, In some embodiments it may be more practical to use a fluid axial bearing and a mechanical radial bearing, or vice-versa. Finally, while embodiments of the invention have been described with reference to their operation in a hydraulic motor, the scope of the invention is not limited to that application. The principles of the invention may be practiced in a wide range of applications to support axial and radial loads.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A bearing comprising:
an insert configured to be received between first and second elements of a machine in which the second element is adapted to rotate with respect to the first element;
a first hydrostatic pad formed in a surface of the insert and positioned to exert a separating force between the first and second elements when pressurized;
a second hydrostatic pad formed in the surface of the insert and positioned to exert a separating force between the first and second elements when pressurized, a total effective area of all of the hydrostatic pads of the bearing being selectively variable during rotation of the second element with respect to the first element; and
a bushing between the first and second elements configured to allow rotation of the second element with respect to the first element while the first and second pads are pressurized at less than a hydrostatic balance force.

2. The bearing of claim 1 wherein the first hydrostatic pad comprises a first plurality of hydrostatic pads formed in the surface of the insert, the pads of the first plurality being in fluid communication with each other.

3. The bearing of claim 2 wherein the second hydrostatic pad comprises a second plurality of hydrostatic pads formed in the surface of the insert, the pads of the second plurality being in fluid communication with each other.

4. The bearing of claim 1, comprising a third hydrostatic pad formed in the surface of the insert.

5. The bearing of claim 1 wherein the surface of the insert has a cylindrical shape and is configured to receive a cylindrical second element.

6. The bearing of claim 5 wherein the surface of the insert encompasses less than 360 degrees of the cylindrical shape.

7. The bearing of claim 6, further comprising an additional insert including a surface encompassing a portion of the 360 degrees of the cylindrical shape not encompassed by the surface of the insert.

8. The bearing of claim 7, further comprising a third hydrostatic pad formed in the surface of the additional insert.

9. The bearing of claim 5 wherein the second hydrostatic pad is divided such that a first portion of the second pad is positioned on one side of the first pad and a second portion of the second pad is positioned on an opposite side of the first pad.

10. The bearing of claim 1 wherein the surface of the insert is substantially planar and configured to receive the second element in rotation about an axis perpendicular to the surface, and wherein the first and second pads each have an arcuate form.

11. The bearing of claim 1, further comprising a controller configured to selectively supply fluid pressure to the first and second pads such that a the total of the separating force exerted between the first and second elements is less than the hydrostatic balance force, by substantially removing fluid pressure from one of the first and second pads when the balance force approaches the separating force, reducing the total effective area of all of the hydrostatic pads of the bearing, and thereby reducing the total separating force.

12. The bearing of claim 11 wherein the controller is configured to regulate fluid pressure in the first and second pads such that the total separating force exerted between the first and second elements is less than the hydrostatic balance force, by substantially removing fluid pressure from the other of the first and second pads when the balance force approaches the reduced separating force, thereby further reducing the total separating force.

13. The bearing of claim 11 wherein the controller is configured to regulate pressurized fluid to the first and second pads such that the total of the separating force exerted between the first and second elements is momentarily at least equal to the balance force.

14. A machine comprising:
a first element;
a second element configured to rotate with respect to the first element;
a first hydrostatic pad positioned between the first and second elements and configured to exert a separating force between the first and second elements when pressurized;
a bushing between the first and second elements configured to allow rotation of the second element with respect to the first element while the first hydrostatic pad is pressurized at less than a hydrostatic balance force; and
a controller configured to selectively vary the separating force, during operation of the machine, at a level less than the hydrostatic balance force.

15. The machine of claim 14 wherein the first hydrostatic pad is formed in a surface of one of the first and second elements.

16. The machine of claim 14 wherein the first hydrostatic pad is formed in a surface of an insert received in a recess formed in one of the first and second elements.

17. The machine of claim 14 wherein the first element is a machine casing and the second element is a drive plate of a hydraulic machine.

18. The machine of claim 14, comprising a second hydrostatic pad positioned between the first and second elements and configured to exert a separating force between the first and second elements when pressurized.

19. The machine of claim 18 wherein:
a portion of the second element has a cylindrical shape;
the first element includes an aperture within which the portion of the second element is received; and
the first and second hydrostatic pads and the bushing are positioned in the aperture of the first element.

20. The machine of claim 19 wherein:
the first hydrostatic pad is in a position corresponding to a bottom-dead-center of the machine; and
the second hydrostatic pad comprises first and second sections positioned on opposite sides of the first hydrostatic pad.

21. The machine of claim 20, comprising a third hydrostatic pad having first and second sections positioned on opposite sides of the second hydrostatic pad.

22. The machine of claim 19 wherein the bushing has a shape conforming to less than an entire circumference of the portion of the second element, and is substantially centered in a position corresponding to a bottom-dead-center of the machine.

23. The machine of claim 22, comprising an additional bushing located in the aperture of the first element between the first and second elements and substantially centered in a position corresponding to a top-dead-center of the machine.

24. The machine of claim 18, comprising third and fourth hydrostatic pads positioned between the first and second elements, each configured to exert a separating force between the first and second elements when pressurized, and wherein the first, second, third, and fourth hydrostatic pads are substantially arcuate in shape and are positioned in a surface of one of the first and second elements and surrounded by the bushing.

25. The machine of claim 24 wherein the first and third hydrostatic pads each occupy portions of respective halves of a first circle, and the second and fourth hydrostatic pads each occupy portions of respective halves of a second circle, concentric with the first circle, the first and second hydrostatic pads lying on one side of a line extending between a top-dead-center and a bottom-dead-center of the machine and the third and fourth hydrostatic pads lying on an opposite side of the line from the first and second hydrostatic pads.

26. The machine of claim 25, wherein the controller is configured, while the machine is in operation according to a first polarity, to selectively supply fluid pressure to the first and second hydrostatic pads such that a total separating force exerted by the first and second hydrostatic pads is less than a balance force of the machine, and, while the machine is in operation according to a second polarity, to selectively supply fluid pressure to the third and fourth hydrostatic pads such that a total separating force exerted by the third and fourth hydrostatic pads is less than a balance force of the machine.

27. The machine of claim 14, comprising means for eliminating stiction between the first and second elements.

28. A method comprising:
  applying, in a machine having a fluid bearing positioned between first and second elements, a fluid pressure to first and second hydrostatic pads of the fluid bearing while a separating force exerted by the first and second hydrostatic pads is less than a balance force of the bearing, such that the separating force offsets a portion of a load on the bearing;
  rotating the second element relative to the first element;
  supporting, on a bushing, that portion of the load not offset by the separating force;
  reducing the load on the bearing; and
  removing, before the load on the bearing drops below the separating force, fluid pressure from the first hydrostatic pad to establish a lower separating force exerted by the second pad alone.

29. The method of claim 28, comprising removing, before the load on the bearing drops below the lower separating force, fluid pressure from the second hydrostatic pad.

30. The method of claim 28, comprising switching fluid pressure from the first and second hydrostatic pads to third and fourth hydrostatic pads when a polarity of the machine is reversed.

* * * * *